United States Patent
Miyake

(10) Patent No.: US 10,416,645 B2
(45) Date of Patent: Sep. 17, 2019

(54) NUMERICAL CONTROLLER ENABLING INCREASE IN NUMBER OF ANALYSIS DIGITS OF PROGRAM INSTRUCTION

(71) Applicant: FANUC CORPORATION, Minamitsuru-gun, Yamanashi (JP)

(72) Inventor: Masahiko Miyake, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 101 days.

(21) Appl. No.: 15/446,468

(22) Filed: Mar. 1, 2017

(65) Prior Publication Data
US 2017/0255180 A1    Sep. 7, 2017

(30) Foreign Application Priority Data
Mar. 4, 2016   (JP) .................. 2016-042774

(51) Int. Cl.
*G05B 19/19*     (2006.01)
*G06F 7/535*     (2006.01)
*G05B 19/408*    (2006.01)

(52) U.S. Cl.
CPC ......... *G05B 19/19* (2013.01); *G05B 19/4086* (2013.01); *G06F 7/535* (2013.01); *G05B 2219/34083* (2013.01); *G05B 2219/41481* (2013.01)

(58) Field of Classification Search
CPC ............... G05B 19/19; G05B 19/4086; G05B 2219/34083; G05B 2219/41481; G06F 7/535
See application file for complete search history.

(56) References Cited

U.S. PATENT DOCUMENTS

| | | | |
|---|---|---|---|
| 6,765,360 B1 | 7/2004 | Hashimoto | |
| 8,229,590 B2* | 7/2012 | Chuang | G05B 19/4097 409/132 |
| 2008/0082203 A1* | 4/2008 | Watanabe | G05B 19/40937 700/187 |
| 2011/0009993 A1* | 1/2011 | Chuang | G05B 19/4097 700/98 |

(Continued)

FOREIGN PATENT DOCUMENTS

| | | |
|---|---|---|
| JP | 63-269204 A | 11/1988 |
| JP | 05-181522 A | 7/1993 |

(Continued)

OTHER PUBLICATIONS

Decision to Grant a Patent for Japanese Application No. 2016/042774, dated Jun. 5, 2018 with translation, 6 pages.

*Primary Examiner* — Abdelmoniem I Elamin
(74) *Attorney, Agent, or Firm* — RatnerPrestia

(57) ABSTRACT

A numerical controller includes a division setting unit which sets division information for dividing a machining region into a plurality of areas, an area division unit which divides a machining region into a plurality of areas based on division information, a program division unit which generates divided programs respectively used for machining control in the areas, an area coordinate system setting unit which sets a virtual coordinate system in the plurality of areas, and an operation precision setting unit which sets operation precision, and performs internal operation for controlling an operation of a machine in accordance with the virtual coordinate system and the operation precision to control each axis of the machine.

3 Claims, 9 Drawing Sheets

(56) References Cited

U.S. PATENT DOCUMENTS

2011/0093666 A1* 4/2011 Endo .................. G05B 19/4155
711/154
2016/0291582 A1* 10/2016 Iwamura .............. G05B 19/409

FOREIGN PATENT DOCUMENTS

| | | | |
|---|---|---|---|
| JP | 05-282022 | A | 10/1993 |
| JP | 08-328635 | A | 12/1996 |
| JP | 09141579 | A | 6/1997 |
| JP | 11-175229 | A | 7/1999 |
| JP | 2000047719 | A | 2/2000 |
| WO | 200122184 | A1 | 3/2001 |

* cited by examiner

CIRCULAR INTERPOLATION BLOCK INCLUDED
IN ORIGINAL PROGRAM

N12 G02 X350.2001234 Y-144.1666467 I209.7666671 J0.;

CIRCULAR INTERPOLATION BLOCK TO BE INCLUDED
IN PROGRAM FOR AREA (6, 6)

N12 G02 X277.3001111 Y-198.2750001 I209.7666671 J0.;

CIRCULAR INTERPOLATION BLOCK TO BE INCLUDED
IN PROGRAM FOR AREA (7, 6)

PROGRAM FOR AREA (6, 6)

```
N01 G00 X-200. Y-200.;
N02 G01 G90 F3000.;
N03 X-99.9998766;
N04 Y-99.9997655;
N05 X200.0000000;
      :
```

PROGRAM FOR AREA (7, 6)

```
(N00 G00 X-200. Y-99.9997655;)
N02 G01 G90 F3000.;
N05 X-185.9998887;
N06 Y0.0121444;
N07 X-171.9999888;
N08 Y150.1134512;
N09 X-160.3116899 Y200.0000000;
      :
```

PROGRAM FOR AREA (7, 7)

```
(N00 G00 X-160.3116899. Y-200.;)
N02 G01 G90 F3000.;
N09 X-66.5926482 Y200.0000000;
      :
```

PROGRAM FOR AREA (7, 8)

```
(N00 G00 X-66.5926482 Y-200.;)
N02 G01 G90 F3000.;
N09 X-19.6810323 Y0.2223456;
N10 X-200.0000000;
      :
```

PROGRAM FOR AREA (6, 8)

```
(N00 G00 X200. Y0.2223456;)
N02 G01 G90 F3000.;
N10 X100.2345321;
N11 Y200.0000000;
      :
```

NUMERICAL CONTROLLER ENABLING INCREASE IN NUMBER OF ANALYSIS DIGITS OF PROGRAM INSTRUCTION

BACKGROUND OF THE INVENTION

1. Field of the Invention

The present invention relates to a numerical controller and especially relates to a numerical controller which is capable of increasing the number of analysis digits of a program instruction.

2. Description of the Related Art

In general, in internal operation of a numerical controller, the number of decimal places to be interpreted is preliminarily set in interpretation of an axis instruction (X123.456789, for example) in a program instruction (for example, see Japanese Patent Application Laid-Open No. 8-328635, Japanese Patent Application Laid-Open No. 63-269204, Japanese Patent Application Laid-Open No. 05-181522, Japanese Patent Application Laid-Open No. 05-282022, and Japanese Patent Application Laid-Open No. 11-175229). This setting value is referred to below as the "minimum setting unit".

The number of decimal places can be described in more detail than the minimum setting unit as a program format (X123.45678912, for example). Therefore, a numerical controller handles a program instruction in a manner to round an instructed digit after the decimal point at the minimum setting unit, irrespective of an instruction of the number of decimal places in the program instruction.

The minimum setting unit is determined based on the following external factors and internal factors of a numerical controller.

[External Factor 1: Limit by Display Region and Input Region on screen]

If the number of decimal places which is set in the minimum setting unit is increased so as to enable interpretation of a coordinate position of more number of digits, for example, in a numerical controller, the number of instruction digits for each value is increased. If the number of instruction digits is excessively increased, the number of digits for program display or position display, for example, is excessively increased, causing complicated management. Further, parameters, offset data, and the like are often linked with the minimum setting unit, so that the number of digits for parameters, offset data, or the like is also increased more than necessary disadvantageously.

[External Factor 2: Limit by Stroke Length of Machine and Stroke Length Which can be Set for Every Setting Unit]

A machine needs the stroke length corresponding to the size of a machining region. If the number of decimal places which is set in the minimum setting unit is increased while maintaining the stroke length, the data length (number of bits) required for one value has to be increased in internal operation. On the other hand, if the number of decimal places which is set in the minimum setting unit is increased while fixing the data length of one value in internal operation, the stroke length has to be decreased.

[External Factor 3: Limit by Resolution of Detector]

In the case where the number of decimal places which is set in the minimum setting unit is increased so as to enable interpretation of more number of digits than resolution of a position detector which detects a position of a workpiece or a position of a tool in a machining region, even if a coordinate position of more number of digits is instructed in a program, the detector is not capable of detecting the minimum digit of the instructed coordinate position. Thus, it is impossible to precisely perform positioning on the instructed coordinate position of more number of digits. On the other hand, in the case where the number of decimal places set in the minimum setting unit is larger than resolution of a detector, enhancement of precision can be expected by increasing the number of decimal places which is set in the minimum setting unit within a range of the resolution of the detector.

[Internal Factor 1: Limit by Register Length in Operation Register of Numerical Controller]

In the case where the register length of operation register is 32 bits, a range from −2147483648 to +2147483647 can be expressed when a signed single integer is used to express one value. Here, in the case where one value in mm unit is expressed by a signed single integer with the minimum setting unit of six digits after the decimal point in internal operation of the numerical controller having the register length of 32 bits, a coordinate position in a range from −2147.483648 mm to +2147.483647 mm can be expressed. Further, in the case where one value in mm unit is expressed with the minimum setting unit of seven digits after the decimal point, a coordinate position in a range from −214.7483648 mm to +214.7483647 mm can be expressed. In the case where the number of decimal places set in the minimum setting unit is increased without changing a range of a stroke of a machine to be a control object in such numerical controller, it is required to use a signed double integer instead of a signed single integer.

[Internal Factor 2: Limit by Resources (Processing Time and Memory Consumption)]

As described in Internal factor 1 above, in the case where the number of decimal places set in the minimum setting unit is increased without changing the stroke length of a machine to be a control object, it is necessary to handle more data in internal operation, increasing processing time of operation or memory consumption by necessity. However, there is a limit in an operation speed or a data transfer speed of a CPU included in a numerical controller, so that processing for generating data for controlling the machine may not be completed within a cycle of a control operation if the number of operation digits is easily increased.

In a numerical controller, the number of decimal places set in the minimum setting unit is determined in a realistic range while studying the above-mentioned various factors in a comprehensive manner. For example, in the case where internal operation of a numerical controller is performed with a signed single integer of 32 bits, a coordinate position in a range from −2147.483648 mm to +2147.483647 mm (approximately ±2 m of stroke, as illustrated in FIG. 9) can be expressed when the minimum setting unit is set to six digits after the decimal point as described above. If the stroke of a machine to be a control object is in a range from −2 m to +2 m, no problem occurs in controlling of the machine. Therefore, the number of decimal places set in the minimum setting unit is set to six digits. Here, in FIG. 9, the reference numeral 2 denotes a tool and the reference numeral 3 denotes a workpiece which is placed on a table 4.

Here, in the case where resolution of a detector of a machine which is controlled by a numerical controller which is set as described above is equal to or smaller than 0.000001 mm, enhancement in precision can be expected by allowing the machine to interpret an instruction to a lower digit, perform operation, and perform final pulse distribution to lower digits. However, if the number of decimal places set in the minimum setting unit is merely set as 7 digits, the stroke which can be handled by the numerical controller is −214.7483648 to +214.7483647 (approximately ±0.2 m of stroke) as mentioned above. Therefore, even when ±2 m of stroke length of the machine is desired to be secured, the stroke becomes ±0.2 m at a maximum due to the limit of the numerical controller and thus, the machine does not function as a machine for performing machining. That is, even in the case when a control object is a high precision machine including a high precision detector, high precision machining cannot be performed if the numerical controller cannot handle this. On the other hand, a numerical controller which is provided with many resources and is capable of performing high precision interpretation of a value and high precision operation in internal operation thereof is expensive to require high cost for installation thereof.

SUMMARY OF THE INVENTION

An object of the present invention is to provide a numerical controller which is capable of interpreting down to a lower digit than the minimum setting unit while suppressing increase of resources of the numerical controller.

A numerical controller according to the present invention controls at least one drive shaft to control a machine, which machines a workpiece placed in a machining region, based on a program composed of at least one block, and includes a division setting unit which sets division information which is information related to a plurality of areas obtained when the machining region is divided, an area coordinate system setting unit which sets a virtual coordinate system in the plurality of areas based on the division information, an operation precision setting unit which sets operation precision based on the division information, an instruction analysis unit which analyzes divided programs, which are obtained by dividing the program based on the division information, in accordance with the virtual coordinate system and the operation precision and outputs instruction data for instructing an operation of the machine based on an analysis result, an interpolation unit which calculates interpolation data representing a position of the drive shaft on a moving path in each interpolation period in accordance with the virtual coordinate system and the operation precision, based on the instruction data, and an acceleration/deceleration unit which performs adjustment of a speed of the drive shaft in each interpolation period with respect to the interpolation data in accordance with the virtual coordinate system and the operation precision.

The numerical controller may further include a program division unit which generates divided programs respectively used for machining control in the areas based on the program and the division information.

The program division unit may be configured such that with relation to a block for instructing movement of the drive shaft among a plurality of blocks included in the program, in a case where the movement is performed over two or more areas among the plurality of areas, the program division unit divides a path of the movement into a plurality of paths on the two or more areas, generates a plurality of blocks for instructing movement on the plurality of paths, which are obtained through the division, and inserts the plurality of blocks into respective programs respectively used for machining control in the two or more areas so as to generate divided programs.

According to the present invention, the number of digits in which a movement instruction of a program is interpreted can be increased in a manner to suppress increase in a processing speed and a memory. As a result, in the case where resolution of a detector is smaller than a setting unit, more detailed and precise pulse distribution is enabled, being able to expect precision enhancement of a machining object. Further, a setting unit is as that of the prior art, so that handling of position display, for example, can be performed in a conventional condition or can be performed by increasing the number of digits.

BRIEF DESCRIPTION OF THE DRAWINGS

FIG. 6 illustrates an example of divided programs obtained through division of the program of FIG. 4 by a program division method according to the present invention.

DETAILED DESCRIPTION OF THE PREFERRED EMBODIMENT

Figure 1:
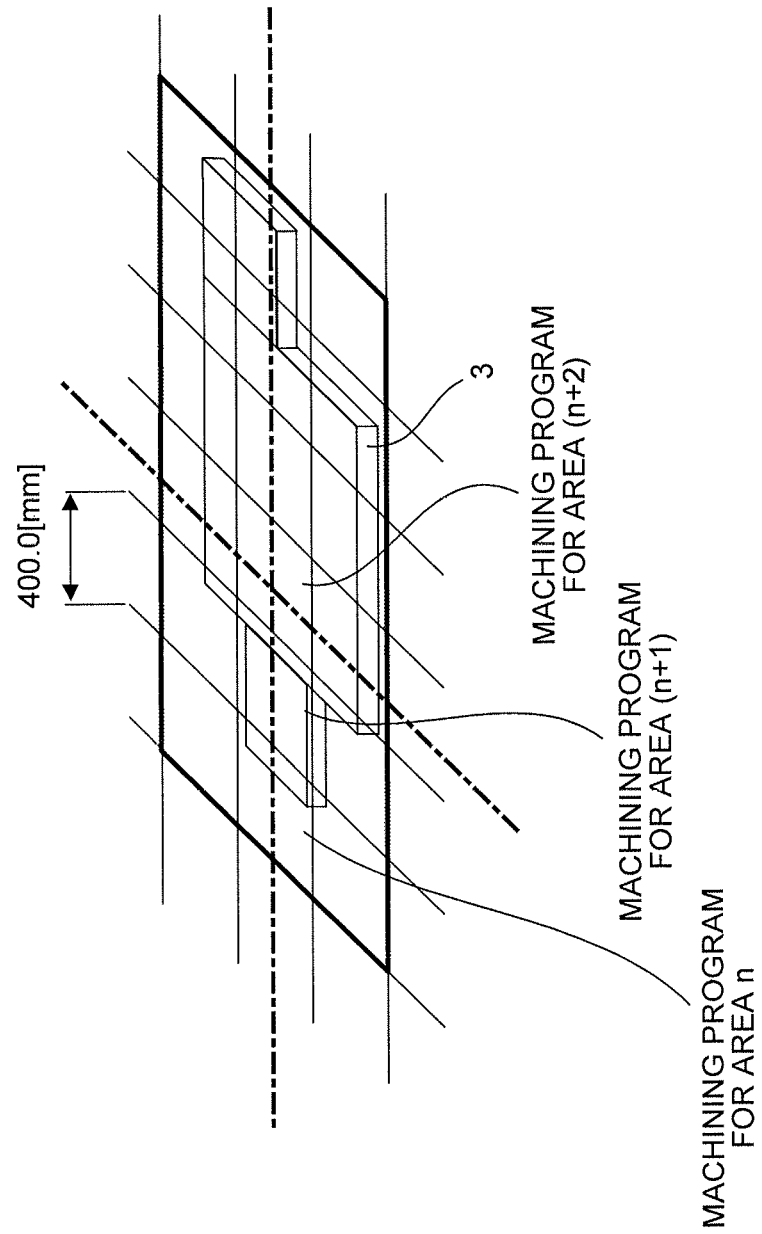
FIG. 1 illustrates an outline of a method for increasing the number of analysis digits in internal operation processing of a numerical controller according to the present invention.

A numerical controller according to the present invention divides a machining region into a plurality of areas as illustrated in FIG. 1 and generates divided programs for performing machining with respect to divided machining ranges respectively, based on an original program. Then, the numerical controller according to the present invention controls a machine based on the divided programs so as to machine a workpiece 3. An area machined based on each divided program is smaller than the whole machining region. Therefore, it is possible to perform machining using a virtual coordinate system in which the number of decimal places, which is set in the minimum setting unit, is increased in a manner to narrow the stroke length, without changing the register length and the like used for internal operation processing of the numerical controller, in execution of the divided programs.

Figure 2:
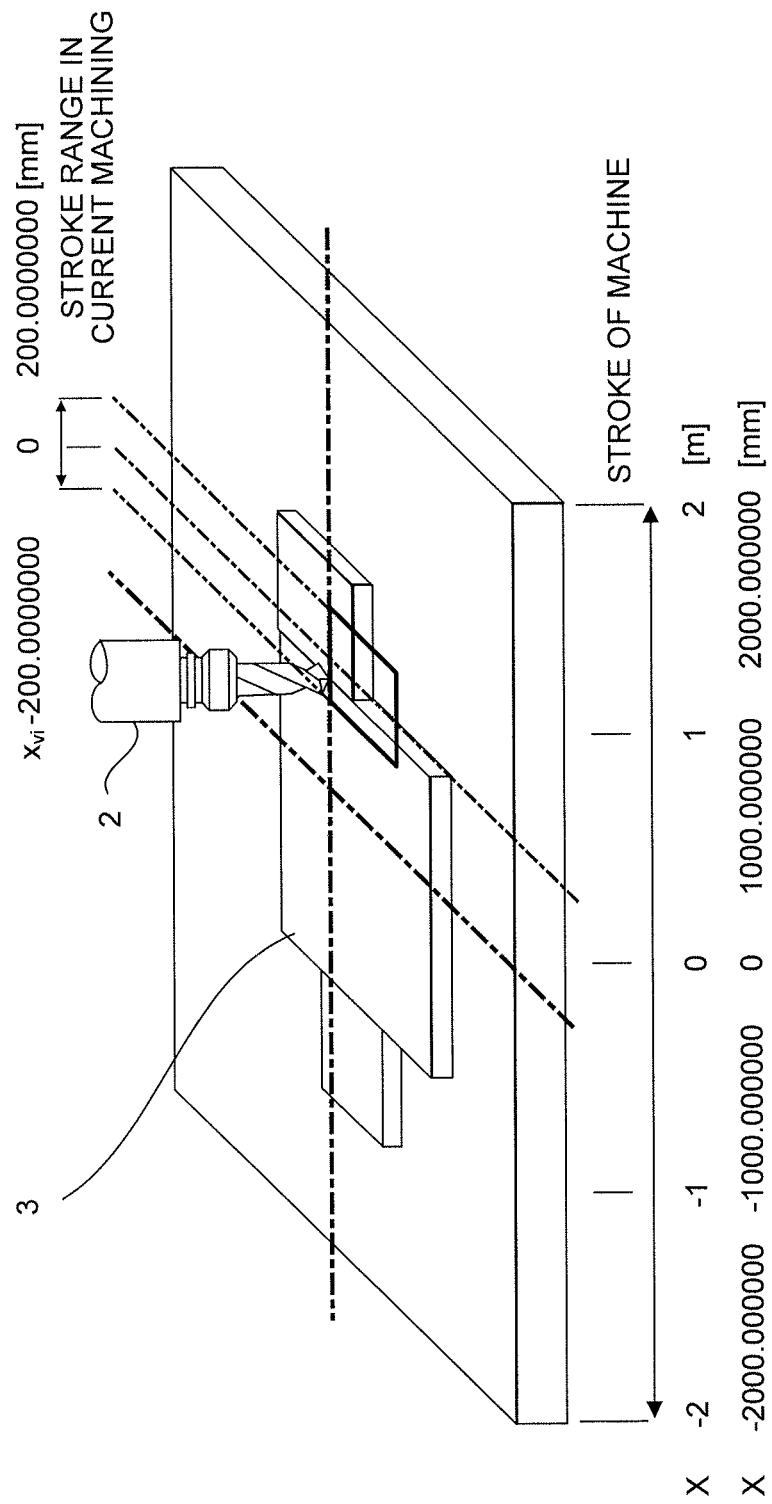
FIG. 2 illustrates an aspect in which the numerical controller according to the present invention executes divided programs so as to machine a workpiece.

For example, in the case where a machine which handles a machining region from −2 m to +2 m in both of the X axis direction and the Y axis direction is controlled and the machining region is divided by 10 in both coordinate axis directions, the size of each area is 1/10 on one side compared to the machining region. Accordingly, when the divided programs are executed, machining can be performed in a virtual coordinate system in which the maximum number of digits of a coordinate value of a region to be machined is decreased by one digit and the number of decimal places set in the minimum setting unit is increased by one digit while using a single integer in the numerical controller. Accordingly, though a range which can be machined by one divided program is narrowed as illustrated in FIG. 2 (the stroke length is 400.0 mm which is from −200 mm to +200 mm), interpretation and operation of a coordinate value can be performed with precision, at which the number of decimal places is increased, in execution of the divided program, enhancing machining precision. Further, through execution of all divided programs, the workpiece 3 can be machined by a tool 2 in the same machining range as the case in execution of an original program.

Figure 3:
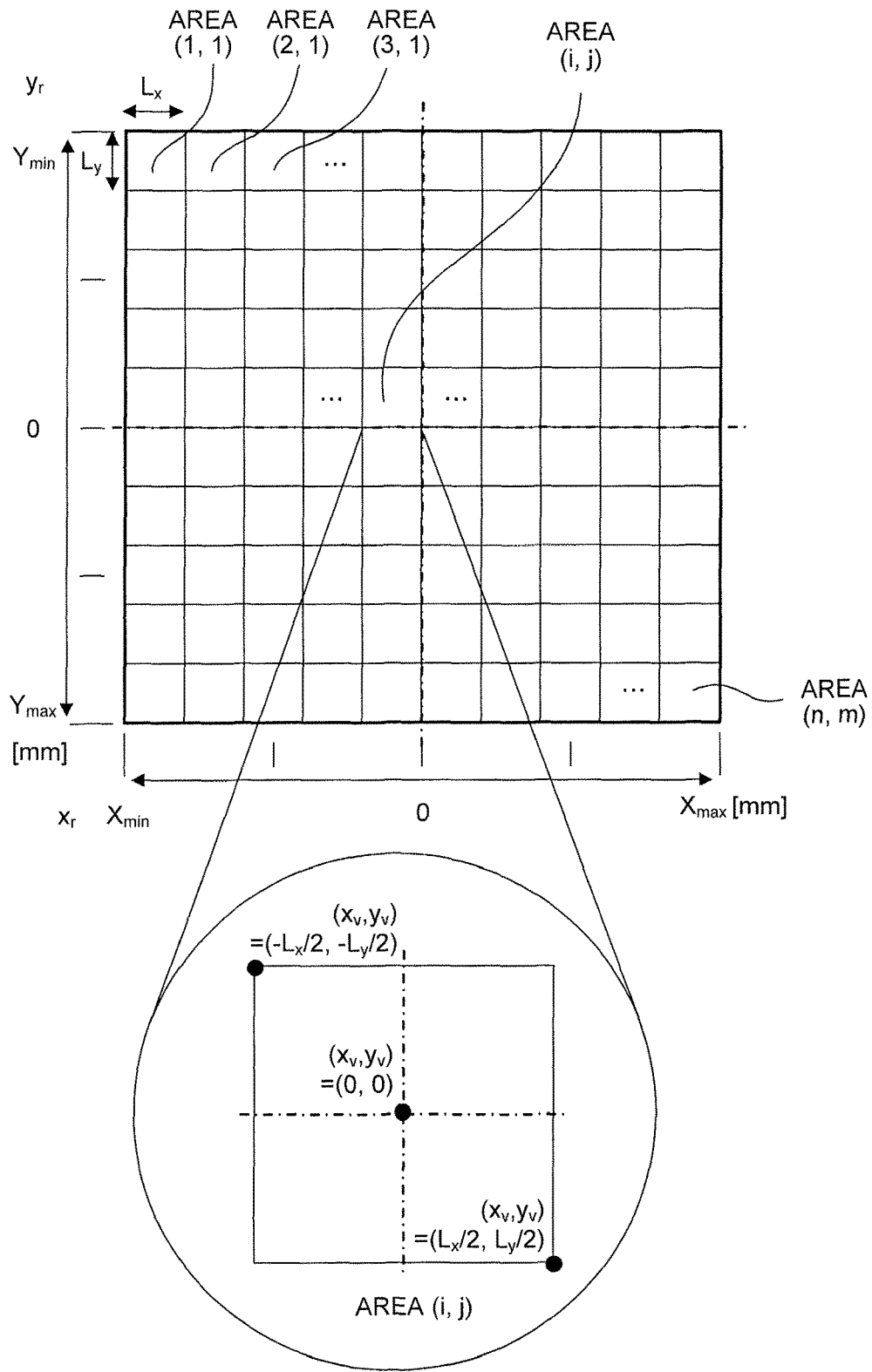
FIG. 3 illustrates an example of an area division method for machining region according to the present invention.

FIG. 3 illustrates a dividing example of a machining region expressed by the XY coordinate system.

In the example of FIG. 3, a machining region where the X coordinate value is $X_{min}$ to $X_{max}$, the Y coordinate value is $Y_{min}$ to $Y_{max}$, and a center position is an origin (0, 0) is equally divided to n pieces in the X axis direction and to m pieces in the Y axis direction so as to obtain n−m pieces of areas. In this case, the width Lx in the X axis direction and the width Ly in the Y axis direction of the divided area are expressed by the following formulas (1).

$$L_x = \frac{X_{max} - X_{min}}{n} \quad (1)$$

$$L_y = \frac{Y_{max} - Y_{min}}{m}$$

Further, in the case where the divided areas are set as area (1, 1), area (2, 1), area (i, j), . . . , and area (n, m) respectively from the negative direction to the positive direction of the X axis and the Y axis as illustrated in FIG. 3, a point expressed by an actual coordinate value $(x_r, y_r)$ on the machining region belongs to the area (i, i) corresponding to a couple (i, j) satisfying a determination formula of the following formulas (2).

$$-\frac{L_x}{2} + (i-1) \times L_x - \frac{(n-1) \times L_x}{2} \leq \quad (2)$$

$$x_r \leq \frac{L_x}{2} + (i-1) \times L_x - \frac{(n-1) \times L_x}{2}$$

$$-\frac{L_y}{2} + (j-1) \times L_y - \frac{(m-1) \times L_y}{2} \leq y_r \leq$$

$$\frac{L_y}{2} + (j-1) \times L_y - \frac{(m-1) \times L_y}{2}$$

Further, in the case where a virtual coordinate space the center of which is an origin (0, 0) is set in the area (i, j), a relationship between a coordinate value $(x_{vi}, y_{vj})$ in the virtual coordinate space and the actual coordinate value $(x_r, y_r)$ on the machining region can be expressed by the following formulas (3).

$$x_{vi} = x_r - (i-1) \times L_x + \frac{(n-1) \times L_x}{2} \quad (3)$$

$$y_{vj} = y_r - (j-1) \times L_y + \frac{(m-1) \times L_y}{2}$$

A program division method by which a program is divided into programs used for machining control of respective areas, by using the formulas mentioned above will be described below. A program is divided by determining an area to which a moving path of a tool which is instructed in each block, which is included in the program and in which movement of the tool is instructed, belongs.

In determination of an area to which each block belongs, for example, (A) in the case where a block to be an object is a block for instructing linear interpolation, areas to which a start point and an end point of a moving path of the tool instructed by the instruction respectively belong are determined. Here, (a1) in the case where both of the start point and the end point of the moving path of the tool instructed by the instruction of the block, which is the determination object, belong to the same area, only the area to which the start point and the end point belong is machined based on the block, so that the block is included in a program used for machining control in the area (a coordinate value is converted by using the formulas (3) in the case where the coordinate value is designated as an absolute value), and (a2) further, in the case where the start point and the end point of the moving path instructed by the instruction of the block, which is the determination object, belong to different areas, the moving path of the tool instructed by the instruction of the block is divided into moving paths for respective areas and blocks for instructing the moving paths obtained through the division are included in programs used for machining control in respective areas (a coordinate value is converted by using the formulas (3) in the case where the coordinate value is designated as an absolute value).

(B) Further, in the case where a block to be an object is a block for instructing circular interpolation as well, (b1) when the whole of an arc-like moving path belongs to one area, the block is included in a program used for machining control in the area (a coordinate value is converted by using the formulas (3) in the case where the coordinate value is designated as an absolute value), and (b2) further, when the arc-like moving path lies over different areas, the arc-like moving path of the tool instructed by the instruction of the block is divided into arc-like moving paths for respective areas and blocks for instructing the arc-like moving paths obtained through the division are included in programs used for machining control in respective areas (a coordinate value is converted by using the formulas (3) in the case where the coordinate value is designated as an absolute value).

Here, blocks other than blocks for instructing movement of the tool may be included in programs used for machining control in all areas.

Figure 4:
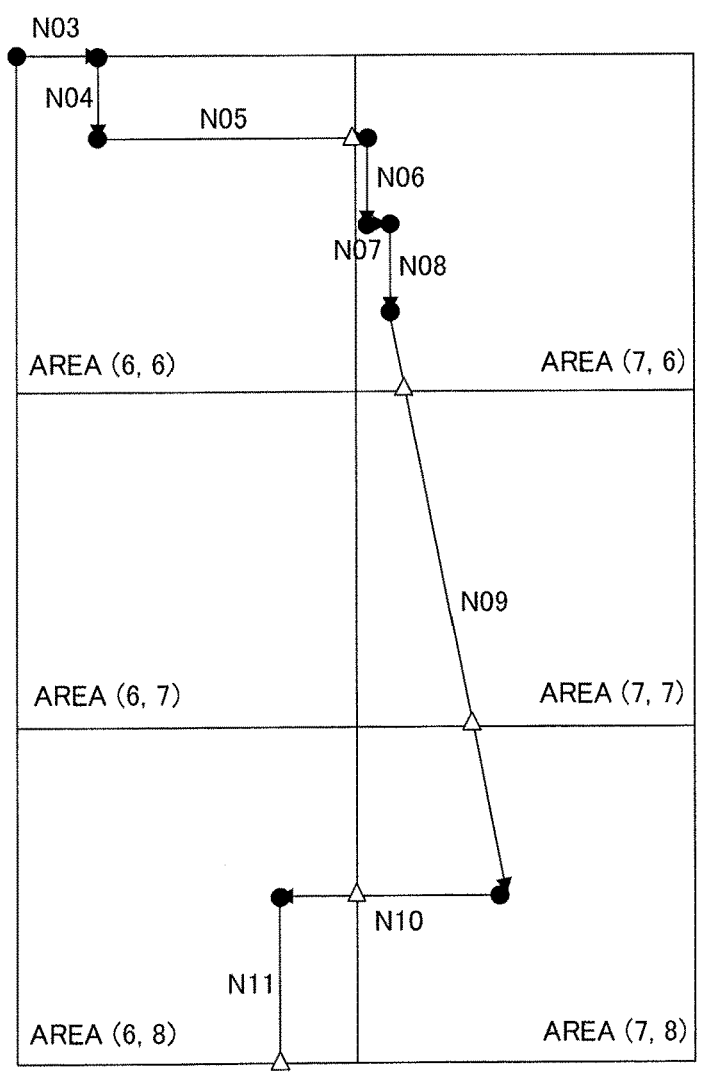
FIG. 4 illustrates a method for dividing a block which is included in a program and instructs linear interpolation according to the present invention.

For example, an example will be considered in which in the case where a machining region a coordinate value of which can take ±2000.0 [mm] in both of the X axis direction and the Y axis direction ($X_{min}=Y_{min}=-2000.0$ [mm], $X_{max}=Y_{max}=+2000.0$ [mm]) is equally divided by 10 in both of the X axis direction and the Y axis direction (n=m=10) to obtain areas in the dividing example illustrated in FIG. 3, a program illustrated in FIG. 4 is divided into programs used for machining control in respective areas.

Since both of a start point and an end point of a moving path of a tool instructed by each of N03 block and N04 block belong to area (6, 6), the N03 block and the N04 block are included in a program used for machining control in the area (6, 6). Further, since both of a start point and an end point of a moving path of the tool instructed by each of N06 block, N07 block, and N08 block belong to area (7, 6), the N06 block, the N07 block, and the N08 block are included in a program used for machining control in the area (7, 6).

Meanwhile, as for a moving path of the tool instructed by N05 block, a start point belongs to the area (6, 6) and an end point belongs to the area (7, 6), so that the moving path of the tool instructed by the N05 block is divided for the area (6, 6) through which the moving path of the tool passes and for a boundary position of the area (6, 6) (A point in FIG. 4 which is on the moving path of the tool instructed by the N05 block and on which a boundary between the area (6, 6) and the adjacent area (7, 6) and the moving path intersect with each other), blocks for instructing respective moving paths obtained through the division are generated, and respective blocks are included in a program for machining the area (6, 6) and a program for machining the area (7, 6). The same applies to N09 block, N10 block, and N11 block.

Figure 5:
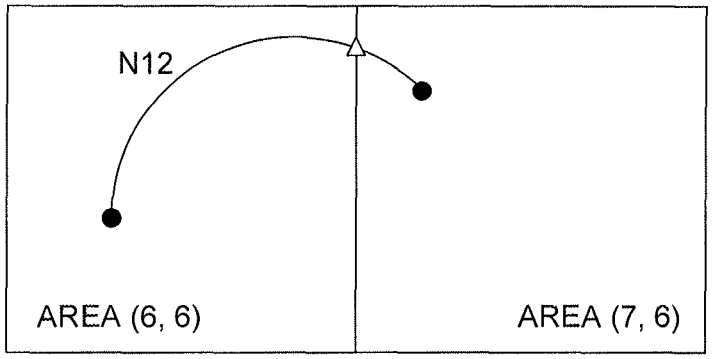
FIG. 5 illustrates a method for dividing a block which is included in a program and instructs circular interpolation according to the present invention.

Further, for example, in the case where a circular interpolation block is included in a program as illustrated in FIG. 5, whether or not a moving path of a tool instructed by the circular interpolation instruction intersects with a boundary between an area and the adjacent area is determined. In the case where the moving path intersects with the boundary, the moving path is divided on the intersection point (A point on the moving path of the tool instructed by N12 block of FIG. 5), blocks for instructing respective moving paths obtained through the division are generated, and respective blocks are included in a program for machining the area (6, 6) and a program for machining the area (7, 6).

Through execution of such procedure with respect to each block included in the program, the program illustrated in FIG. 4 is divided into programs illustrated in FIG. 6 and used for machining control of respective areas.

Here, precision in the number of digits of a coordinate value described in each program is maintained by using operation processing with a double integer for the above-mentioned division of a moving path or the above-mentioned conversion from an actual coordinate value into a virtual coordinate value for each area with the formulas (3). Though the operation processing using double integer values consumes more resources than operation processing using single integer values, the operation amounts of the division processing of a moving path and the conversion processing of a coordinate value are much smaller than those of interpolation processing of a moving path and acceleration/deceleration processing performed in machining control, not exerting a major effect on the whole processing speed.

The configuration of a numerical controller which executes the above-described program division processing and performs machining control based on divided programs will be described below.

Figure 7:
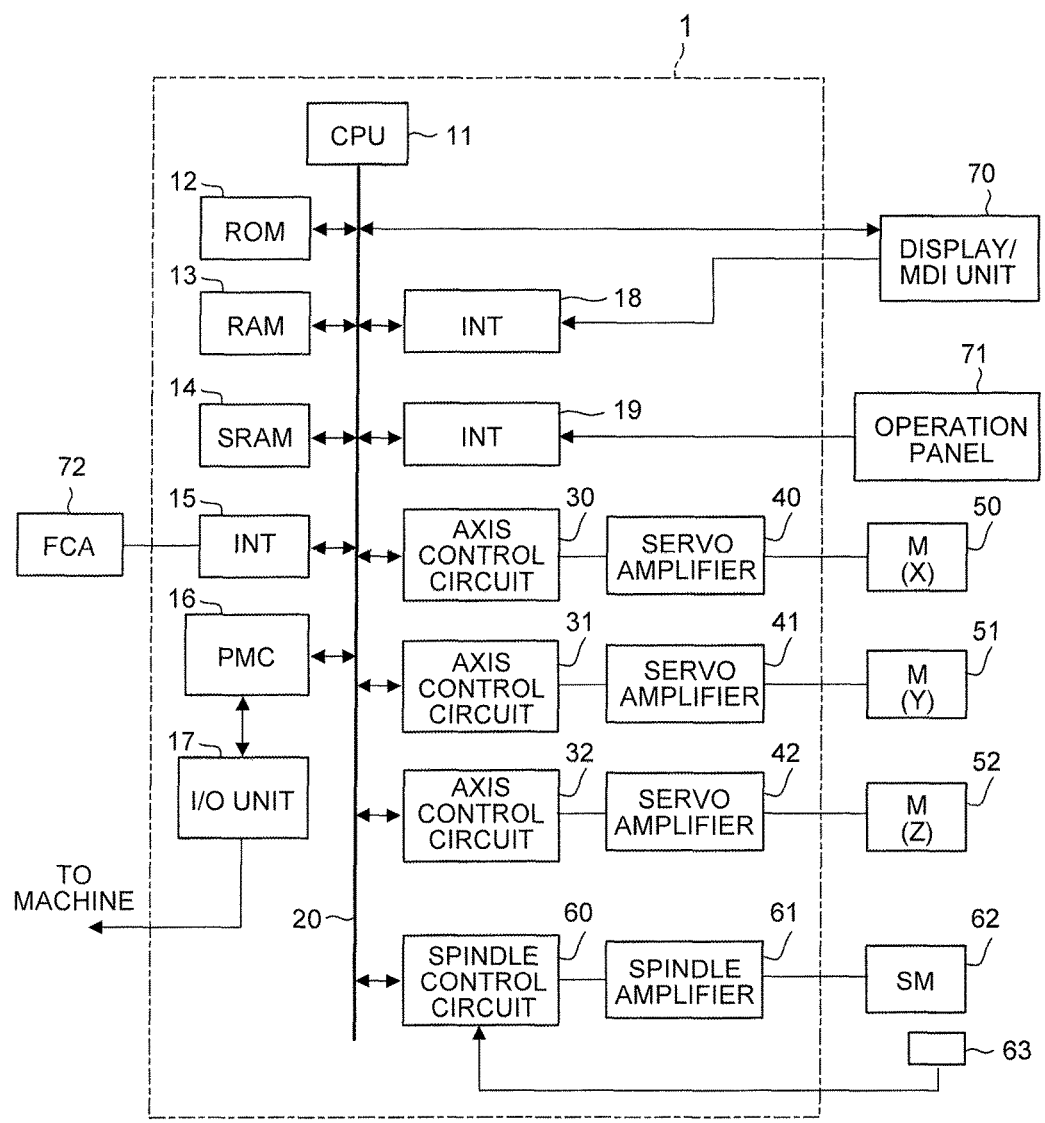
FIG. 7 is a chief part configuration diagram of a numerical controller according to an embodiment of the present invention.

FIG. 7 is a hardware configuration diagram illustrating chief parts of a numerical controller according to an embodiment of the present invention.

A CPU 11 is a processor for totally controlling a numerical controller 1. The CPU 11 reads a system program stored in a ROM 12 via a bus 20 so as to control the whole of the numerical controller 1 in accordance with the system program. In a RAM 13, temporal calculation data and display data and various types of data inputted by an operator via a display/MDI unit 70, for example, are stored.

An SRAM 14 is backed up by a buttery, which is not illustrated, and is configured as a non-volatile memory a storage state of which is maintained even when the numerical controller 1 is turned off. In the SRAM 14, a machining program which is read via an interface 15 and will be described later and a machining program which is inputted via the display/MDI unit 70, for example, are stored. Further, in the ROM 12, various types of system programs for executing processing of an edit mode, which is required for generation and edition of a machining program, and the above-described program division processing are preliminarily written. Various types of machining programs such as a machining program related to the present invention can be inputted via the interface 15 and the display/MDT unit 70 so as to be stored in the SRAM 14.

The interface 15 is an interface for connecting the numerical controller 1 with an external device 72 such as an adapter. From the external device 72, machining programs and various types of parameters, for example, are read. Further, a machining program edited in the numerical controller 1 can be stored in an external storage unit via the external device 72. A programmable machine controller (PMC) 16 outputs a signal to an auxiliary apparatus (for example, an actuator such as a robot hand for tool exchange) of a machine tool via the I/O unit 17 based on a sequence program stored in the numerical controller 1 so as to control the auxiliary apparatus. Further, the PMC 16 receives signals of various types of switches and the like of an operation panel provided to a main body of the machine tool, performs necessary signal processing, and then transfers the signals subjected to the signal processing to the CPU 11.

The display/MDI unit 70 is a manual data input device including a display, a keyboard, and the like. An interface 18 receives instructions and data from the keyboard of the display/MDI unit 70 so as to transfer the instruction and the data to the CPU 11. An interface 19 is connected to an operation panel 71 including a manual pulse generator and the like.

Axis control circuits 30 to 32 of respective axes receive movement instruction amounts of respective axes from the CPU 11 and output instructions for respective axes to servo amplifiers 40 to 42. The servo amplifiers 40 to 42 receive these instructions respectively so as to drive servo motors 50 to 52 of respective axes. The servo motors 50 to 52 of respective axes incorporate position/speed detectors and feedback position/speed feedback signals from these position/speed detectors to the axis control circuits 30 to 32, thus performing position/speed feedback control. Here, in the block diagram, the position/speed feedback is omitted.

A spindle control circuit 60 receives a spindle rotation instruction with respect to a machine tool and outputs a spindle speed signal to a spindle amplifier 61. The spindle amplifier 61 receives this spindle speed signal and allows a spindle motor 62 of the machine tool to rotate at an instructed rotation speed so as to drive the tool.

To the spindle motor 62, a position coder 63 is coupled by a gear wheel, a belt, or the like. The position coder 63 outputs a feedback pulse in synchronization with rotation of the spindle and the feedback pulse is read by the CPU 11.

Figure 8:
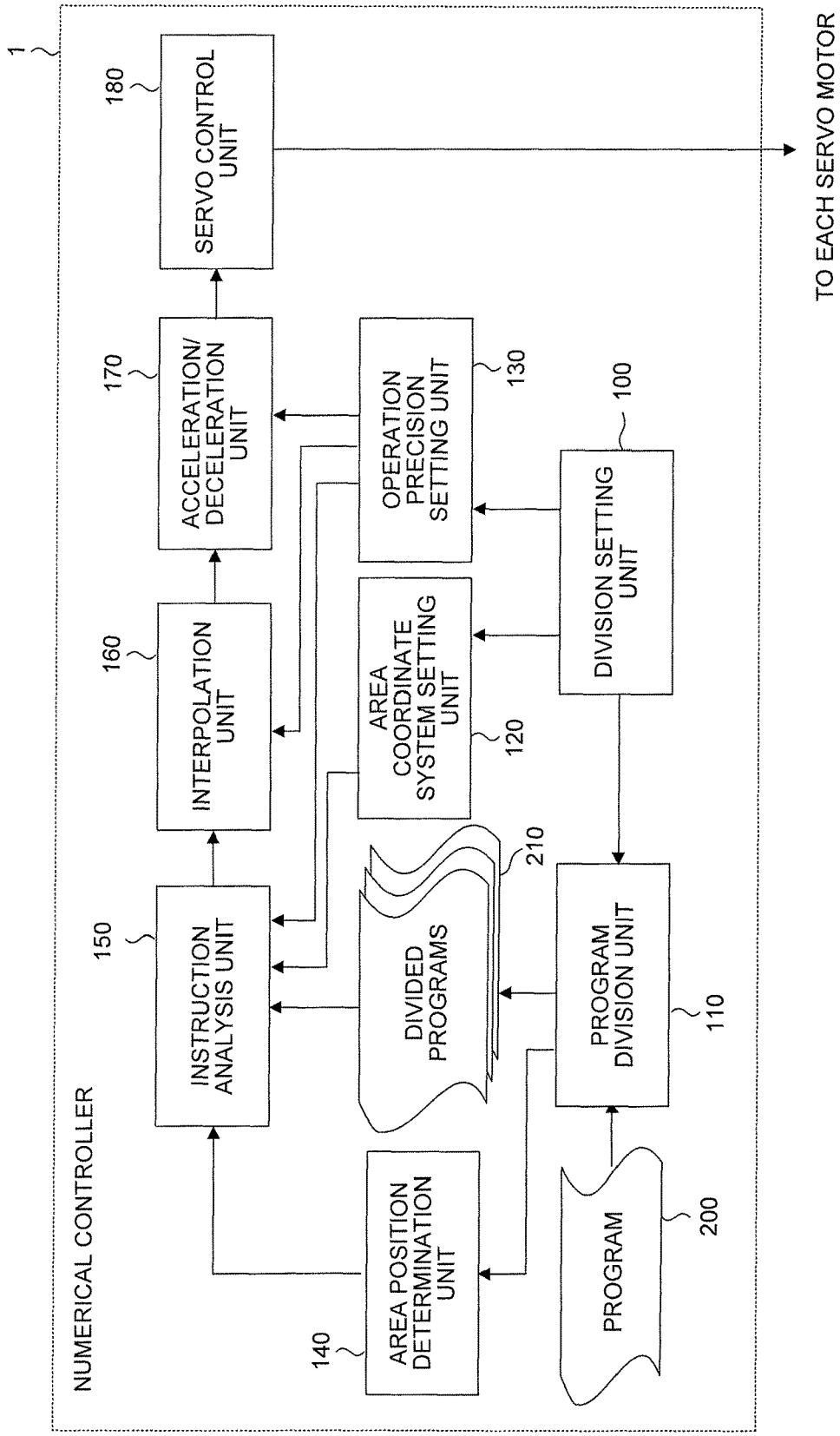
FIG. 8 is a schematic functional block diagram of the numerical controller according to the embodiment of the present invention.
Figure 9:
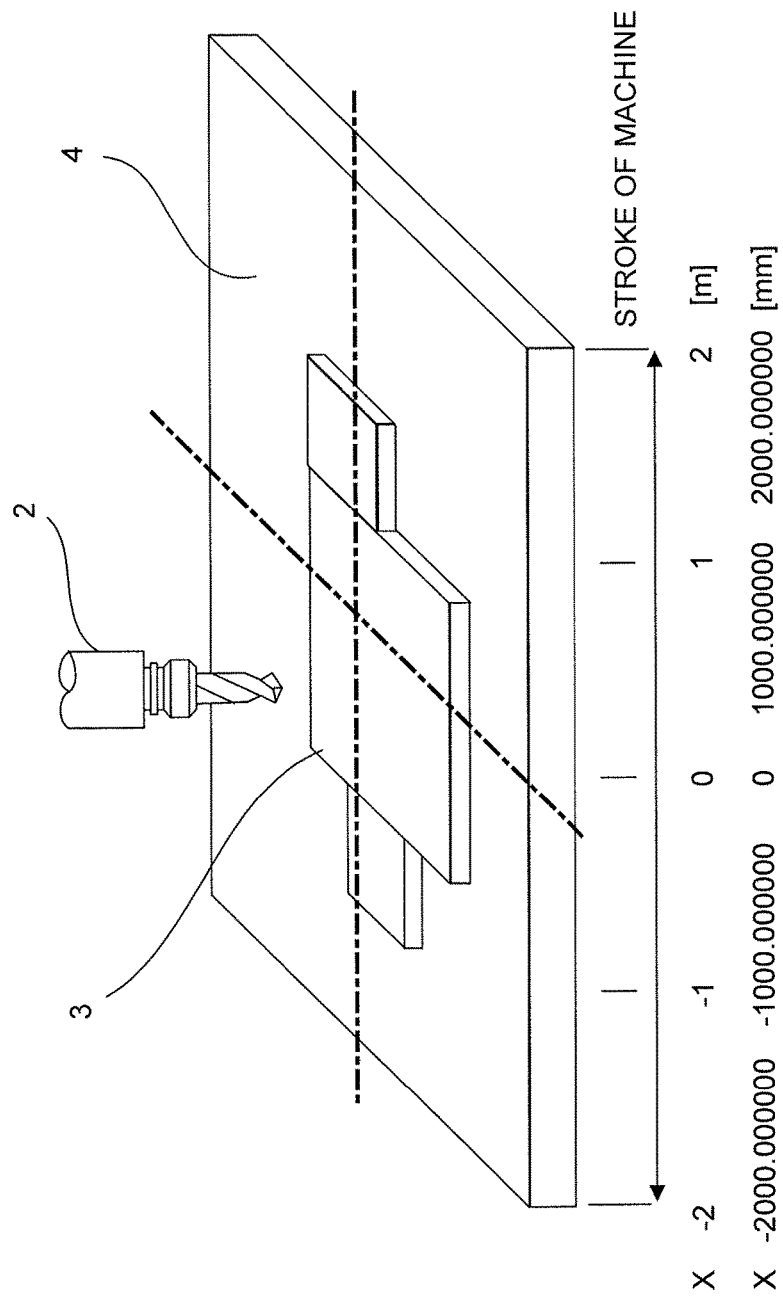
FIG. 9 illustrates a machine tool which machines a workpiece with a numerical controller according to a prior art technique.

FIG. 8 is a schematic functional block diagram illustrating the case where the above-described program division method and the above-described execution method of divided programs are implemented as a system program with respect to the numerical controller 1 illustrated in FIG. 7. The numerical controller 1 includes a division setting unit 100, a program division unit 110, an area coordinate system setting unit 120, an operation precision setting unit 130, an area position determination unit 140, an instruction analysis unit 150, an interpolation unit 160, an acceleration/deceleration unit 170, and a servo control unit 180.

The division setting unit 100 receives an input of a parameter required for area division of a machining region and stores the parameter on a memory such as the SRAM 14. A parameter required for area division varies depending on a method for dividing an area. In the case where the division method described in FIG. 2 is employed, the division setting unit 100 may receive a range of a machining region ($X_{min}$ to $X_{max}$, $Y_{min}$ to $Y_{max}$), an origin position (a center is an origin or an end is an origin in both of a machining region and an area, for example), and the numbers of division (n, m) in the X axis direction and the Y axis direction, for example.

The program division unit 110 virtually divides a machining region based on parameters set by the division setting unit 100 so as to generate programs used for machining control for respective areas obtained through the division by the methods described with reference to FIGS. 2 to 4, for example, based on a program 200. Programs 210 obtained through the division are stored in a region provided on a memory such as the RAM 13.

The area coordinate system setting unit 120 sets a virtual coordinate system for each area in the instruction analysis unit 150, which will be described later, based on parameters set by the division setting unit 100, when the instruction analysis unit 150 executes the above-mentioned programs 210 obtained through the division.

Further, the operation precision setting unit 130 sets the minimum setting unit which can be set in internal operation processing in the instruction analysis unit 150, the interpolation unit 160, and the acceleration/deceleration unit 170 based on parameters set by the division setting unit 100, when the instruction analysis unit 150, which will be described later, executes the programs 210 obtained through the division. The "minimum setting unit which can be set" here can be appropriately set based on the stroke length of each of areas obtained through division by the division setting unit 100 while taking into account the above-described external factors and internal factors of the numerical controller. For example, in the case of area division as that illustrated in FIG. 2, the number of decimal places set in the minimum setting unit can be increased by one.

The area position determination unit 140 outputs an instruction for performing positioning on a machining start position of the program 210 obtained through the division before start of execution thereof to the instruction analysis unit 150, when the instruction analysis unit 150, which will be described later, starts the execution of the program 210 obtained through the division. The machining start position in each area is a position obtained by converting a coordinate value of a point (the A point in FIGS. 4 and 5) on which a tool has entered in the area in an original program into a virtual coordinate value in the area by the formulas (3).

The instruction analysis unit 150 sequentially reads and analyzes blocks from the programs 210 obtained through division and stored in a memory, generates instruction data for instructing movement of respective axes based on the analysis results, and outputs the generated instruction data to the interpolation unit 160. The instruction analysis unit 150 uses the virtual coordinate system set by the area coordinate system setting unit 120 described above in the execution of analysis processing and executes analysis in the minimum setting unit set by the operation precision setting unit 130 described above. An order in which the instruction analysis unit 150 reads a plurality of programs 210 obtained through division does not especially have to be restricted. However, if the instruction analysis unit 150 sequentially reads programs for machining closer areas, the moving distance of a tool is shortened, thereby enabling to shorten the cycle time of machining.

The interpolation unit 160 generates interpolation data which is obtained such that points on an instructed path instructed by instruction data outputted by the instruction analysis unit 150 are interpolated and calculated in an interpolation period based on the instruction data and outputs the generated interpolation data to the acceleration/deceleration unit 170. In execution of interpolation processing by the interpolation unit 160, the interpolation unit 160 uses a virtual coordinate system set by the area coordinate system setting unit 120 and executes analysis in the minimum setting unit set by the operation precision setting unit 130 described above.

The acceleration/deceleration unit 170 performs acceleration/deceleration processing for adjusting a speed of each drive shaft for every interpolation period with respect to interpolation data outputted by the interpolation unit 160 and outputs the interpolation data subjected to the acceleration/deceleration adjustment to the servo control unit 180. In execution of acceleration/deceleration processing by the acceleration/deceleration unit 170, the acceleration/deceleration unit 170 uses a virtual coordinate system set by the area coordinate system setting unit 120 and executes analysis in the minimum setting unit set by the operation precision setting unit 130 described above.

Then, the servo control unit 180 controls drive units (servo motors 50 to 52) of respective axes of a machine which is a control object based on an output of the acceleration/deceleration unit 170.

The numerical controller having such configuration divides a machining region into a plurality of areas and preliminarily generates a plurality of divided programs 210 from the program 200 in conformity with the divided areas. Since the stroke length which is a moving range of a tool is narrower than that of the machining region in the divided programs 210, it is possible to increase the number of decimal places set in the minimum setting unit in analysis processing of an instruction, interpolation processing, and acceleration/deceleration processing without spending resources for operation processing and thus possible to enhance machining precision.

The embodiment of the present invention is described above. However, the present invention is not limited to the example of the above-described embodiment, but the present invention can be embodied in various aspects by making appropriate alterations.

For example, the above-described embodiment shows the example in which a two-dimensional plane in the X axis direction and the Y axis direction is subjected to area division and programs for machining a workpiece in divided areas are generated. However, the three-dimensional space in the X axis direction, the Y axis direction, and the Z axis direction may be subjected to area division. In this case, a formula of the Z axis may be merely added to the formulas (1) to (3) to divide a program by using these formulas.

Further, a machining region is equally divided into areas in the above-described embodiment, but the size of areas is not limited to this and the areas may have the sizes different from each other. In such case, a boundary and the size of each area may be individually set by the division setting unit 100. Then, the program division unit 110, the area coordinate system setting unit 120, and the operation precision setting unit 130 are operated based on information set in that manner so as to deal with areas having different sizes from each other. Thus, a part of a machining region can be divided into subdivided areas and further precise machining can be performed in the part, for example.

Further, the numerical controller performs division of a program in the example of the above-described embodiment. However, instead of the execution of division by the numerical controller, programs divided for respective areas may be preliminarily generated by an external program generation device (such as a CAD apparatus) so as to be executed. In this case, there is no need to provide the program division unit 110 to the numerical controller and the equivalent configuration may be provided to the program generation device.

The invention claimed is:

1. A numerical controller comprising:
a processor for which controlling a machine to perform machining of a workpiece in a machining region based on a program composed of at least one block, the processor configured to:
set division information which is information related to a plurality of areas obtained when the machining region is divided;
set a virtual coordinate system in the plurality of areas based on the division information;
set operation precision based on the division information;
analyze divided programs, the divided programs being obtained by dividing the program based on the division information, in accordance with the virtual coordinate system and the operation precision and outputs instruction data for instructing an operation of the machine based on an analysis result;
calculate interpolation data representing a position of a drive shaft on a moving path in each interpolation period in accordance with the virtual coordinate system and the operation precision, based on the instruction data;
control a speed of a servo motor in each interpolation period with respect to the interpolation data in accordance with the virtual coordinate system and the operation precision, the servo motor driving the machine along an axis in the virtual coordinate system; and
control a spindle motor to rotate a machine tool for machining the workpiece in the virtual coordinate system.

2. The numerical controller according to claim 1, wherein the processor is further configured to generate divided programs respectively used for machining control in the areas based on the program and the division information.

3. The numerical controller according to claim 2, wherein the processor is further configured such that with relation to a block for instructing movement of the drive shaft among a plurality of blocks included in the program, in a case where the movement is performed over two or more areas among the plurality of areas, the processor divides a path of the movement into a plurality of paths on the two or more areas, generates a plurality of blocks for instructing movement on the plurality of paths, the paths being obtained through the division, and inserts the plurality of blocks into respective programs respectively used for machining control in the two or more areas so as to generate divided programs.

* * * * *